United States Patent
Shahidi et al.

(10) Patent No.: US 8,385,350 B2
(45) Date of Patent: Feb. 26, 2013

(54) DETECTION FOR END OF SERVICE USING DYNAMIC INACTIVITY TIMER THRESHOLDS

(75) Inventors: Reza Shahidi, San Diego, CA (US); Ajith T. Payyappilly, San Diego, CA (US); Srinivasan Balasubramanian, San Diego, CA (US); Lei Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 11/743,802

(22) Filed: May 3, 2007

(65) Prior Publication Data

US 2008/0123527 A1 May 29, 2008

Related U.S. Application Data

(60) Provisional application No. 60/867,429, filed on Nov. 28, 2006.

(51) Int. Cl.
*H04L 12/28* (2006.01)
*H04W 4/00* (2009.01)

(52) U.S. Cl. .................... 370/395.21; 370/328
(58) Field of Classification Search .............. 370/352, 370/328, 329, 401, 389, 392, 311, 335, 338, 370/433, 468, 395.21, 395.4, 431; 455/418, 455/343.1, 445, 450, 452.1, 455
See application file for complete search history.

(56) References Cited

U.S. PATENT DOCUMENTS

| | | | |
|---|---|---|---|
| 7,126,924 B2 * | 10/2006 | Suzuki et al. ............... 370/311 |
| 7,289,480 B2 | 10/2007 | Lundstrom et al. | |
| 2002/0172178 A1 * | 11/2002 | Suzuki et al. ............... 370/338 |
| 2003/0235171 A1 * | 12/2003 | Lundstrom et al. ........... 370/338 |
| 2004/0248577 A1 * | 12/2004 | Sayeedi ....................... 455/445 |
| 2005/0237977 A1 * | 10/2005 | Sayeedi ....................... 370/331 |
| 2006/0002358 A1 * | 1/2006 | Ray et al. .................... 370/342 |
| 2006/0109846 A1 * | 5/2006 | Lioy et al. ................... 370/389 |
| 2006/0190600 A1 | 8/2006 | Blohm et al. | |
| 2007/0049314 A1 * | 3/2007 | Balachandran et al. ...... 455/518 |

(Continued)

FOREIGN PATENT DOCUMENTS

| | | |
|---|---|---|
| CN | 1703875 A | 11/2005 |
| EP | 1482691 | 12/2004 |

(Continued)

OTHER PUBLICATIONS

Written Opinion—PCT/US07/085528, International Search Authority—European Patent Office—May 28, 2008.

(Continued)

*Primary Examiner* — Hanh Nguyen
(74) *Attorney, Agent, or Firm* — Kevin T. Cheatham

(57) ABSTRACT

Techniques to detect for end of service using dynamic inactivity timer thresholds are described. An access terminal establishes a radio connection for one or more applications. Data and signaling for the application(s) may be sent on one or more first flows (e.g., RLP flows) that may carry any number of second flows (e.g., IP flows). The access terminal determines a dynamic inactivity timer threshold for each first flow, e.g., based on at least one inactivity timer threshold for at least one second flow mapped to that first flow. The access terminal determines whether each first flow is inactive based on the inactivity timer threshold for that first flow, e.g., declares each first flow to be inactive if no activity is detected on that first flow for a period exceeding the inactivity timer threshold. The access terminal closes the radio connection when all first flow(s) are determined to be inactive.

8 Claims, 7 Drawing Sheets

U.S. PATENT DOCUMENTS

| | | | |
|---|---|---|---|
| 2007/0248080 A1* | 10/2007 | Nesargi et al. | 370/352 |
| 2007/0259673 A1* | 11/2007 | Willars et al. | 455/453 |

FOREIGN PATENT DOCUMENTS

| | | | |
|---|---|---|---|
| JP | 2000261372 A | 9/2000 | |
| JP | 2003037874 A | 2/2003 | |
| JP | 2003526276 A | 9/2003 | |
| JP | 2005515707 A | 5/2005 | |
| JP | 2005531180 A | 10/2005 | |

OTHER PUBLICATIONS

International Search Report—PCT/US07/085528, International Search Authority—European Patent Office—May 28, 2008.

Taiwan Search Report—TW096145223—TIP—Dec. 13, 2011.

* cited by examiner

DETECTION FOR END OF SERVICE USING DYNAMIC INACTIVITY TIMER THRESHOLDS

BACKGROUND

I. Field

This application claims the benefit under 35 U.S.C. §119 of Provisional Application Ser. No. 60/867,429, filed Nov. 28, 2006, said provisional application is incorporated herein by reference.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, etc.

A user may utilize an access terminal (e.g., a cellular phone) to obtain one or more communication services (e.g., voice, data connectivity, etc.) from a wireless network. The access terminal may establish a radio connection with the wireless network and may be allocated radio and other resources for the radio connection. The access terminal may thereafter exchange data with the wireless network via the radio connection to obtain the communication service(s).

For each service, data may be exchanged at regular intervals or at sporadic times. For example, a voice call may exchange data periodically every 20 milliseconds (ms) or some other interval. A packet data call may exchange data sporadically whenever there is data to send. It is desirable to close the radio connection as soon as all of the service(s) have ended. This would then free up the valuable resources allocated for the radio connection so that the resources may be used for another access terminal. However, determining whether the service(s) have ended may be challenging, e.g., if multiple services are obtained and/or if data is sent sporadically.

There is therefore a need in the art for techniques to efficiently detect for end of service so that the radio connection may be closed as soon as possible.

SUMMARY

Techniques to detect for end of service using dynamic inactivity timer thresholds are described herein. An access terminal establishes a radio connection with an access network for one or more applications, which may engage any communication services. Data and signaling for the application(s) may be sent on at least one first flow that may carry any number of second flows. For example, each first flow may correspond to a Radio Link Protocol (RLP) flow at a link layer, and each second flow may correspond to an Internet Protocol (IP) flow at a network layer. The first and second flows may also correspond to other flows at other layers.

The access terminal determines a dynamic inactivity timer threshold for each first flow based on at least one second flow mapped to that first flow, e.g., based on at least one inactivity timer threshold for the at least one second flow mapped to the first flow. A dynamic inactivity timer threshold is an inactivity timer threshold that can change and is not fixed at a predetermined value. A default value may be used for any inactivity timer threshold that is not specified or is unavailable. The dynamic inactivity timer threshold for each first flow may also be determined based on the type of data and/or signaling to be sent on that first flow and/or other factors. In any case, the access terminal determines whether each first flow is inactive based on the inactivity timer threshold for that first flow. The access terminal may maintain an inactivity timer for each first flow, reset the inactivity timer whenever activity is detected on the first flow, and declare the first flow to be inactive when the inactivity timer exceeds the inactivity timer threshold. The access terminal may close the radio connection when all of the at least one first flow is determined to be inactive.

The access network may also detect for end of service for the access terminal using dynamic inactivity timer thresholds, e.g., in an analogous manner described above. Various aspects and features of the disclosure are described in further detail below.

DETAILED DESCRIPTION

The techniques described herein may be used for various wireless communication networks. The terms "network" and "system" are often used interchangeably. For example, the techniques may be used for CDMA, TDMA, FDMA, and OFDMA networks, OFDM-based networks, etc. A CDMA network may implement a radio technology such as cdma2000, Wideband-CDMA (W-CDMA), etc. cdma2000 covers IS-2000, IS-95, and IS-856 standards. A TDMA network may implement a radio technology such as Global System for Mobile Communications (GSM), Digital Advanced Mobile Phone System (D-AMPS), etc. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, certain aspects of the techniques are described for a High Rate Packet Data (HRPD) network that implements IS-856. An HRPD network is also referred to as a CDMA2000 1×EV-DO network, a 1×EV-DO network, a 1×-DO network, a High Data Rate (HDR) network, etc.

Figure 1:
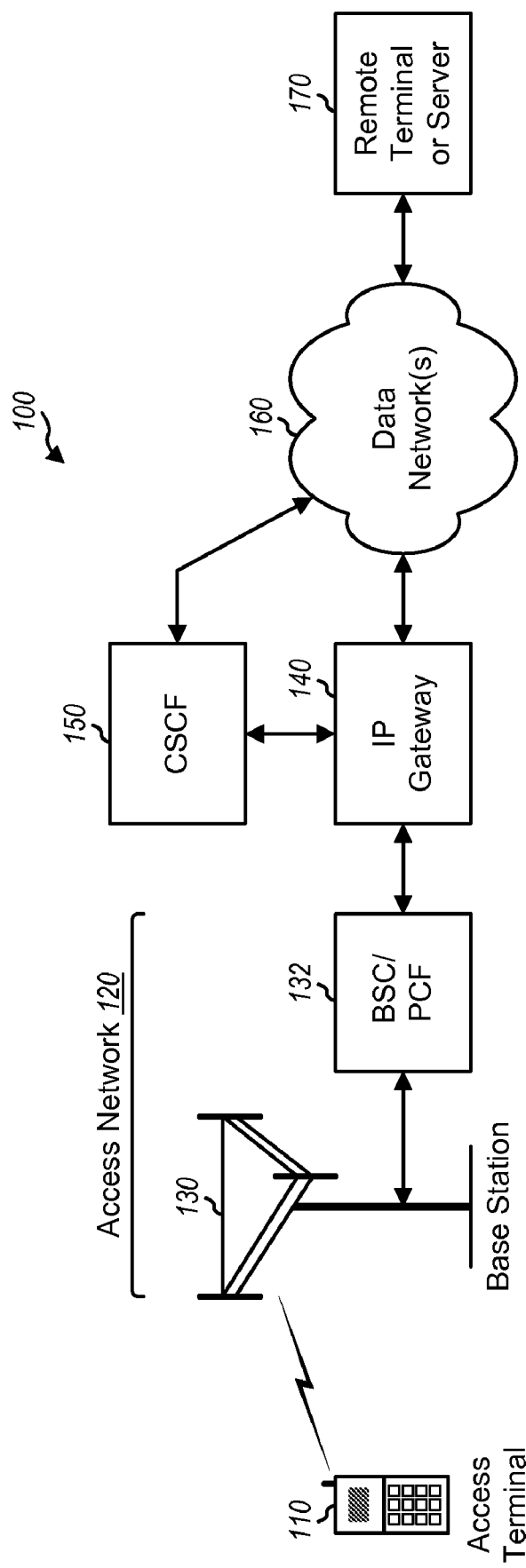
FIG. 1 shows a wireless communication network.

FIG. 1 shows a wireless communication network 100, which may be an HRPD network. Wireless network 100 includes (a) an access network 120 that supports radio communication for access terminals and (b) network entities that perform various functions to support communication services. An access network may also be referred to as a radio network, a radio access network, etc. Access network 120 may include any number of base stations 130 and any number of Base Station Controllers/Packet Control Functions (BSCs/PCFs) 132. A base station is generally a fixed station that communicates with the access terminals and may also be referred to as an access point, a Node B, an enhanced Node B, etc. BSC/PCF 132 couples to a set of base stations, provides coordination and control for the base stations under its control, and routes traffic data for these base stations.

An IP gateway 140 supports data services for access terminals communicating with access network 120. For example, IP gateway 140 may be responsible for the establishment, maintenance, and termination of data sessions for access terminals and may further assign dynamic IP addresses to the access terminals. IP gateway 140 may communicate with other network entities to support the data services. IP gateways 140 may couple to data network(s) 160, which may comprise a core network, private data networks, public data networks, the Internet, etc. IP gateway 140 can communicate with various entities (e.g., a remote terminal or server 170) via data network(s) 160. IP gateway 140 may also be referred to as a Packet Data Serving Node (PDSN). A Call Session Control Function (CSCF) 150 performs various functions to support IP Multimedia Subsystem (IMS) services such as Voice-over-IP (VoIP), multimedia, etc. For example, CSCF 150 may process requests from access terminals for IMS services, perform registration for IMS, provide session control services, maintain session state information, etc. Wireless network 100 may include other network entities not shown in FIG. 1.

An access terminal 110 may communicate with access network 120 to obtain various communication services supported by wireless network 100. Access terminal 110 may also be referred to as a mobile station (MS), a user equipment (UE), a user terminal, a subscriber unit, a station, etc. Access terminal 110 may be a cellular phone, a personal digital assistant (PDA), a wireless modem, a handheld device, a laptop computer, etc. Access terminal 110 may communicate or exchange data with other access terminals, remote terminal or server 170, and/or other entities via access network 120.

Figure 2:
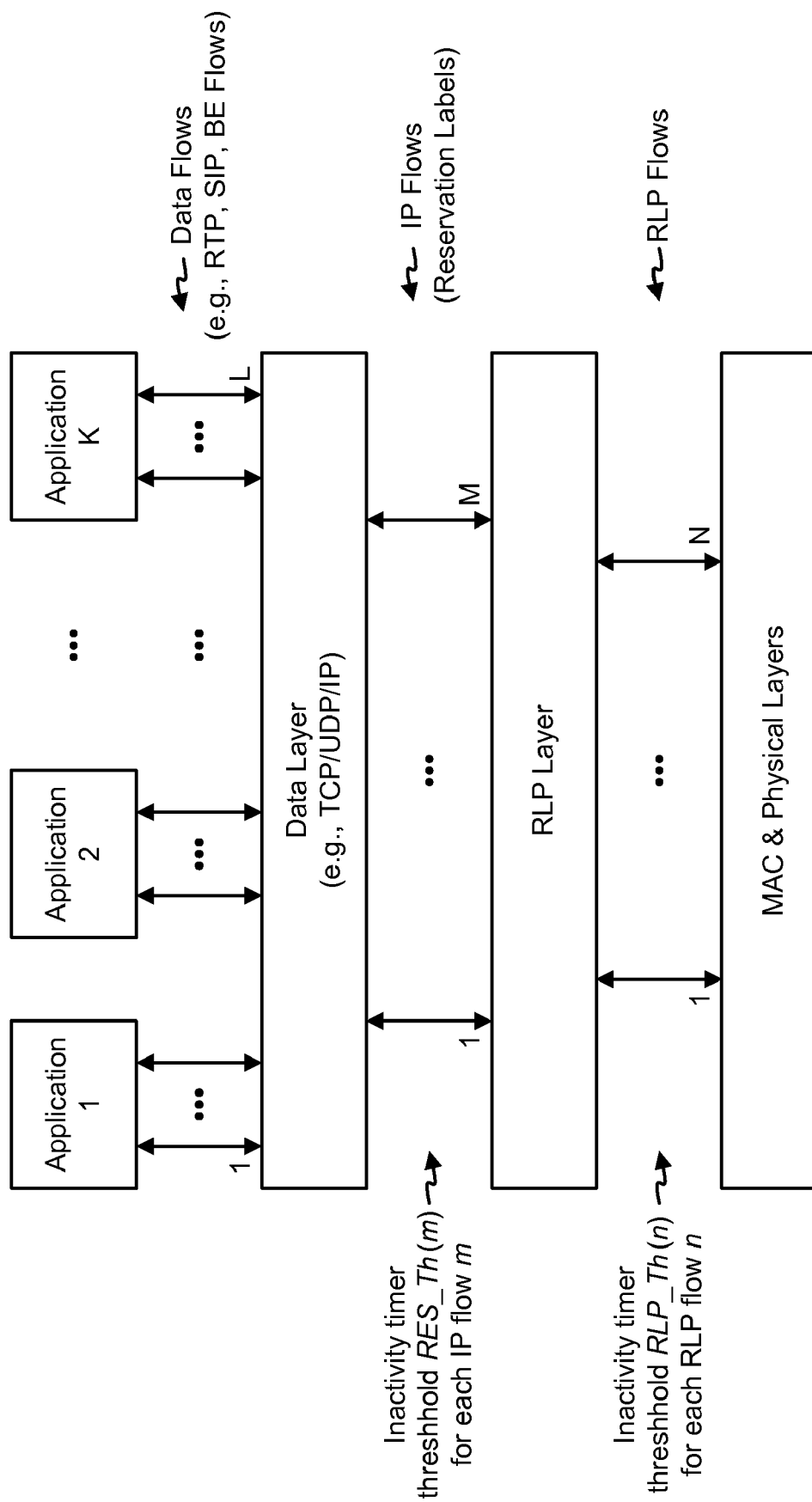
FIG. 2 shows flows at different layers for an access terminal.

FIG. 2 shows flows at various layers for access terminal 110. Access terminal 110 may have K applications that may engage any communication services from wireless network 100, where K may be any number greater than zero. The applications may belong in different classes such as conversational, streaming, interactive, and background. The conversation class may cover delay sensitive applications such as VoIP, video, video conferencing, etc. The streaming class may cover data rate sensitive applications such as video streaming, audio streaming, web casting, etc. The interactive class is characterized by a request/response traffic pattern and may cover applications such as web browsing. The background class is characterized by a relatively insensitive delivery time and may cover applications such as email download. Traffic data for applications in the interactive and background classes may be sent in best effort (BE) flows. Traffic data for applications in the conversation and streaming classes may be sent in flows having certain quality of service (QoS) requirements.

The K applications may communicate with other entities (e.g., remote terminal or server 170) using HyperText Transfer Protocol (HTTP), File Transfer Protocol (FTP), Real-time Transport Protocol (RTP), Session Initiation Protocol (SIP), and/or other protocols at an application layer. HTTP supports transfer of information on the World Wide Web and is commonly used to publish and retrieve HTLM pages. FTP supports transfer of files between two terminals and is commonly use to download data, files, etc. RTP provides end-to-end network transport functions and is suitable for applications sending real-time data such as voice, video, etc. SIP is a signaling protocol for creating, modifying, and terminating sessions for VoIP, multimedia, etc.

Each application may have any number of data flows. A data flow may be an RTP flow, a SIP flow, a best effort flow, etc. Each data flow may be associated with a different port number at a transport layer. In general, a data flow may carry traffic data and/or signaling and may also be referred to as a traffic flow, a signaling flow, etc. For example, a VoIP application may have one or more RTP flows for traffic data and a SIP flow for signaling. The K applications have a total of L data flows, where L may be any number greater than zero.

The L data flows are processed by a data layer and mapped to M IP flows, where M may be any number greater than zero. Each data flow may be mapped to a suitable IP flow, and each IP flow may carry any number of data flows. For example, access terminal 110 may have one or two IP flows to carry RTP and SIP flows for a VoIP application and may have another IP flow to carry a best effort flow for a browser application. Each IP flow is a stream of IP packets that matches a set of one or more packet filters in a traffic filter template (TFT). A packet filter may identify packets based on IP address, port number, etc. Each IP flow is identified by a reservation label, and there is a one-to-one mapping between IP flow and reservation label.

The M IP flows are processed by an RLP layer and mapped to N RLP flows, where N may be any number greater than zero. An RLP flow is also referred to as an RLP instance. In HRPD, access network 120 grants QoS for RLP flows (instead of IP flows or data flows). The desired QoS for a given RLP flow may be specified by a set of QoS parameters, which is referred to as a QoS profile. To reduce signaling, some commonly used QoS profiles are predefined and assigned unique FlowProfileIDs. A QoS request sent by access terminal 110 may then include one or more FlowProfileIDs for one or more desired QoS profiles, instead of entire sets of QoS parameters, which reduces signaling.

The K applications may have certain QoS requirements. Access terminal 110 may determine one or more QoS profiles that can satisfy the QoS requirements of all of the applications. Access terminal 110 may then request one or more RLP flows for the one or more QoS profiles, one RLP flow for each QoS profile. Access terminal 110 may then map each IP flow to an RLP flow that can satisfy the QoS requirements (if any) for that IP flow. Each RLP flow may carry any number of IP flows whose QoS requirements can be satisfied by the QoS profile granted for that RLP flow. For example, one RLP flow may carry SIP flows for one or more applications, another RLP flow may carry RTP flows for VoIP and/or other applications, yet another RLP flow may carry best effort flows for one or more applications, etc.

The N RLP flows are processed by Medium Access Control (MAC) and physical layers and mapped to one or more traffic channels. Access terminal 110 may have established a radio connection with access network 120 and may be assigned one or more traffic channels, a MAC identifier (MACID), and/or other resources. Access terminal 110 may send data via the assigned traffic channel(s) using the assigned MACID. The resources are assigned to access terminal 110 for as long as the radio connection remains open.

The description above is for processing of flows for reverse link (or uplink) transmission from access terminal 110 to access network 120. A flow may carry traffic data and/or signaling for the reverse link direction as well as the forward link (or downlink) direction from access network 120 to access terminal 110.

The K applications may engage any communication services and may have different traffic patterns. For example, a VoIP application may exchange data periodically (e.g., every 20 ms) whereas a browser application may exchange data sporadically. Access terminal 110 may be allocated sufficient resources for the radio connection such that all of the K applications can be satisfactorily served. It is desirable to close the radio connection as soon as all of the services have ended. However, detecting for end of service may not be trivial because (a) some applications such as a browser application may remain open indefinitely and may not explicitly terminate and (b) the data flows for the applications may be mapped to other flows in lower layers in a flexible manner, as described above.

In one scheme to detect for end of service, a single inactivity timer is maintained for all K applications. This inactivity timer is reset whenever an application or a flow is active and exchanges data. If the inactivity timer exceeds a predetermined inactivity timer threshold, then all of the applications are deemed to be inactive, and the radio connection is closed.

Figure 3A:
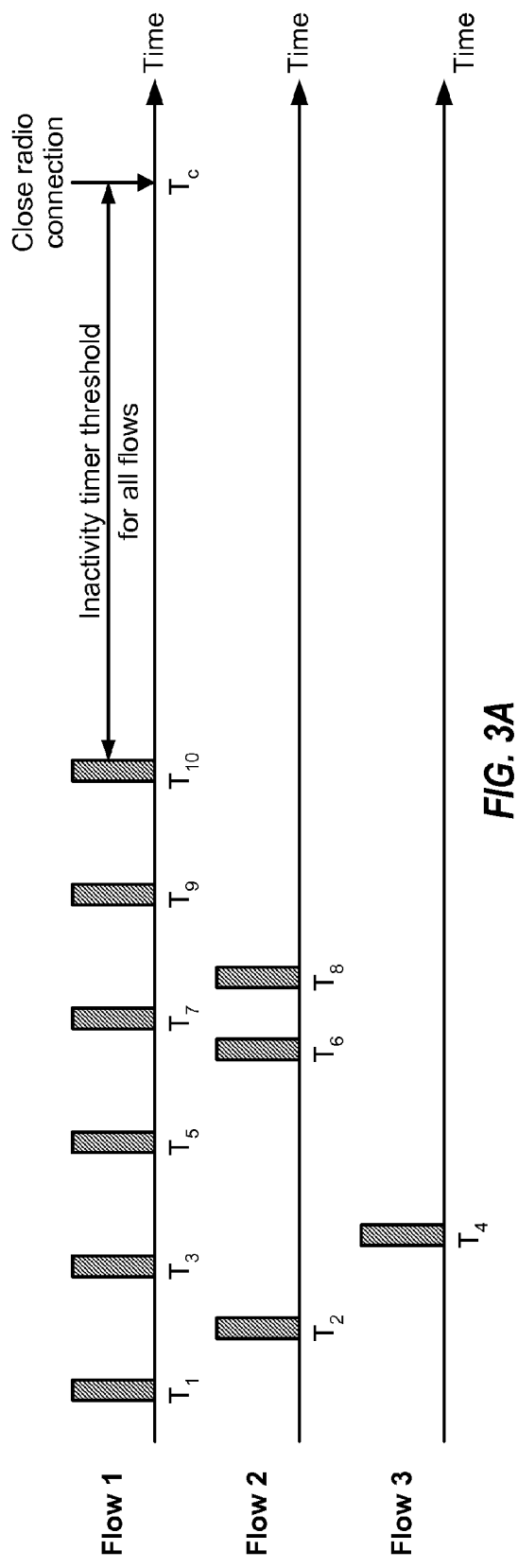
FIG. 3A shows use of a single inactivity timer to detect for end of service.

FIG. 3A shows use of a single inactivity timer to detect for end of service for all applications. In this example, traffic data and signaling for the applications are sent on three flows, which may be data flows, IP flows, or RLP flows. In this example, flow 1 carries traffic data that is sent at regular intervals, e.g., every 20 ms for VoIP. Flow 2 carries traffic data that is sent sporadically, e.g., for text messaging. Flow 3 carries traffic data that is also sent sporadically and less frequently. Activities on each flow are shown by rectangular shaded boxes, where each box may represent reception or transmission of data.

Whenever data is exchanged (e.g., sent or received) on any flow, the single inactivity timer is reset. Thus, the inactivity timer is reset at time $T_1$ when data is exchanged on flow 1, reset again at time $T_2$ when data is exchanged on flow 2, reset at time $T_3$ when data is exchanged on flow 1, reset at time $T_4$ when data is exchanged on flow 3, and so on, and reset again at time $T_{10}$ when data is exchanged on flow 1. At time $T_c$, the inactivity timer exceeds the inactivity timer threshold, and all three flows are deemed to be inactive. At this point, the radio connection may be closed, and the resources allocated to access terminal 110 for the radio connection may be released.

The use of a single inactivity timer for all applications may delay the closing of the radio connection. To achieve satisfactory performance for all applications, the inactivity timer threshold may be selected based on the longest expected period between activities for all flows. For example, flow 1 may have the shortest expected period between activities, and flow 3 may have the longest expected period between activities. In many instances, flow 1 is the flow with the last activity. Access terminal 110 would then need to wait for the inactivity timer to exceed the inactivity timer threshold before the radio connection can be closed, as shown in FIG. 3A. This may result in waste of valuable resources.

Figure 3B:
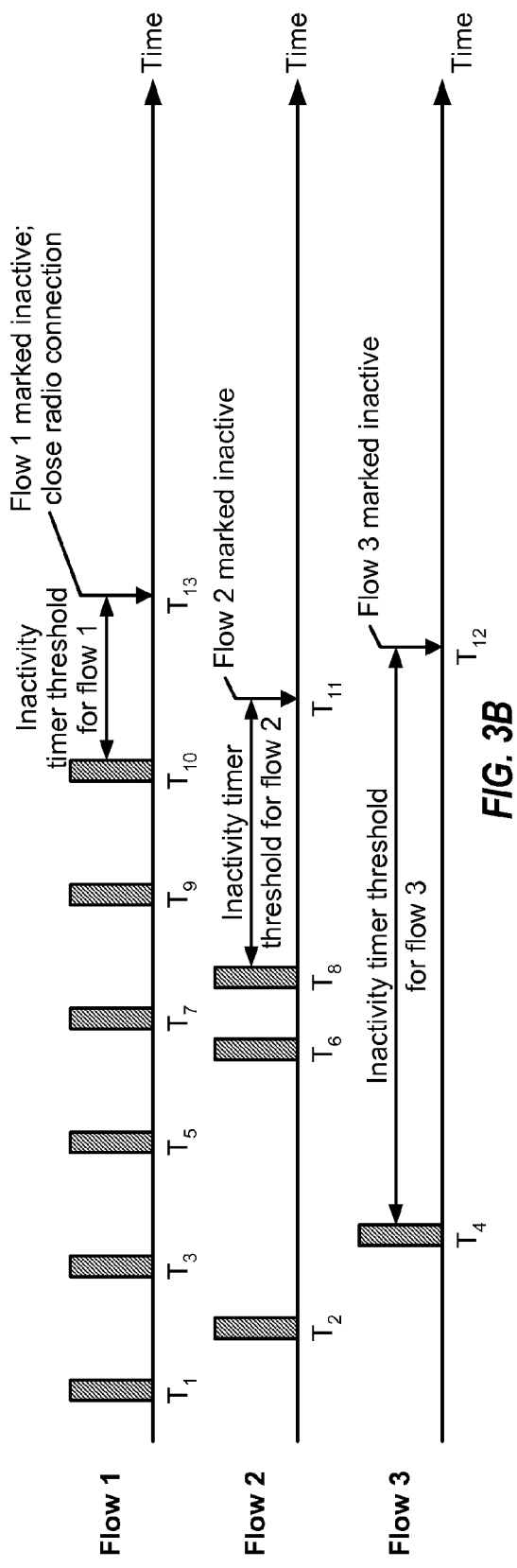
FIG. 3B shows use of a separate inactivity timer for each flow to detect for end of service.

FIG. 3B shows use of a separate inactivity timer for each flow to detect for end of service. In this example, traffic data and signaling for all of the applications are sent on three flows, as described above for FIG. 3A. Flow 1 is associated with an inactivity timer threshold of Th1, flow 2 is associated with an inactivity timer threshold of Th2, and flow 3 is associated with an inactivity timer threshold of Th3. The inactivity timer threshold for each flow may be selected based on the type of traffic data and/or signaling sent on that flow, as described below. A given flow x is deemed to be inactive if no activity is detected on flow x for a period of time equal to or exceeding the inactivity timer threshold Thx for flow x.

A separate inactivity timer is maintained for each flow. Whenever data is exchanged on a given flow, the inactivity timer for that flow is reset. Thus, the inactivity timer for flow 1 is reset at times $T_1, T_3, \ldots, T_{10}$ when data is exchanged on flow 1. Flow 1 is deemed to be inactive at time $T_{13}$ when no activity is detected on flow 1 for Th1 seconds. Similarly, the inactivity timer for flow 2 is reset at times $T_2$, $T_6$ and $T_8$ when data is exchanged on flow 2. Flow 2 is deemed to be inactive at time $T_{11}$ when no activity is detected on flow 2 for Th2 seconds. The inactivity timer for flow 3 is reset at time $T_4$ when data is exchanged on flow 3. Flow 3 is deemed to be inactive at time $T_{12}$ when no activity is detected on flow 3 for Th3 seconds. At time $T_{13}$, all three flows are inactive, and the radio connection may be closed.

As shown in FIGS. 3A and 3B, the use of a separate inactivity timer for each flow may reduce the delay in closing the radio connection. Early closing of the radio connection may save valuable resources. The inactivity timer threshold for each flow may be selected based on the expected period between activities on that flow, which would then ensure satisfactory performance for all applications mapped to the flow. Each flow is deemed to be active or inactive based on activities on that flow and the inactivity timer threshold for the flow.

In general, access terminal 110 may monitor activities on flows at any layer in order to detect for end of service and to close the radio connection. In a first design, which is referred to as RLP monitoring, access terminal 110 monitors activities on RLP flows to detect for end of service. In a second design, which is referred to as IP monitoring, access terminal 110 monitors activities on IP flows to detect for end of service. In other designs, access terminal 110 may monitor activities on flows at other layers.

For RLP monitoring, a dynamic inactivity timer threshold may be defined for each RLP flow based on all IP flows mapped to that RLP flow. The inactivity timer threshold for RLP flow n is denoted as RLP_Th (n), for $n \in \{1, \ldots, N\}$, where N is the number of RLP flows. An inactivity timer threshold may also be defined for each IP flow based on the type of traffic data and/or signaling sent on that IP flow. The inactivity timer threshold for IP flow m is denoted as RES_Th (m), for $m \in \{1, \ldots, M\}$, where M is the number of IP flows.

The inactivity timer threshold for each RLP flow may be defined based on the inactivity timer thresholds for all IP flows that are enabled (or equivalently, for all reservation labels that are open) and mapped to that RLP flow, as follows:

$$\text{RLP\_Th}(n) = \max_{\forall m \in R_n} \{0, \text{RES\_Th}(m)\}, \text{ for } n \in \{1, \ldots, N\}, \quad \text{Eq (1)}$$

where $R_n$ is a set of all IP flows that are enabled and mapped to RLP flow n.

Equation (1) essentially sets the inactivity timer threshold for RLP flow n to the largest inactivity timer threshold among those for the IP flows mapped to RLP flow n. If no IP flows are enabled for RLP flow n, then the inactivity timer threshold for RLP flow n is set to zero, which results in RLP flow n being declared inactive. Equation (1) may be applied to each RLP flow to determine the inactivity timer threshold for that RLP flow.

The inactivity timer threshold RES_Th (m) for a given IP flow m may be determined when IP flow m is created, activated, or modified. RES_Th (m) may be determined by an application creating, activating, or modifying IP flow m or some other entity and may be selected based on the type of traffic data and/or signaling to be sent on IP flow m. Different types of data and signaling may have different activity characteristics. If IP flow m carries periodic traffic, then RES_Th (m) may be selected based on some multiple of the interval between traffic activities. If IP flow m carries sporadic traffic and is activated for an indefinite period of time (e.g., for web browsing), than a timeout or default value may be used for RES_Th (m) to detect if IP flow m is inactive. The default value may be 5, 10, 20 seconds or some other duration. RES_Th (m) may also be set to a large value (e.g., infinity) if an application is responsible for closing IP flow m, which may be the case for VoIP, etc. RES_Th (m) may also be set to infinity if IP flow m is to be retained until the reservation label is turned off. RES_Th (m) may also be set to be equal to or greater than a particular minimum value, if IP flow m is to be monitored for at least this minimum amount of time.

The inactivity timer thresholds for IP flows may also be selected based on other information. For example, the inactivity timer threshold for an IP flow may be selected based on history information on prior activities (e.g., a longer threshold if more activities in recent time), the available battery power of access terminal 110 (e.g., a shorter threshold when low on battery), the loading of access network 120 (e.g., a shorter threshold when the access network is heavily loaded), etc.

The inactivity timer threshold for each RLP flow may be recomputed as shown in equation (1) whenever an IP flow is added, terminated, suspended, resumed, or modified. Adding, terminating, suspending or resuming an IP flow affects the membership of set $R_n$. Modifying an IP flow may affect the value of RES_Th (m) used in the max operator in equation (1). A default value may be used for the inactivity timer threshold for a best effort RLP flow. The default value for the best effort RLP flow may be the same as, or different from, the default value for IP flows without specified inactivity timer thresholds.

Figure 4:
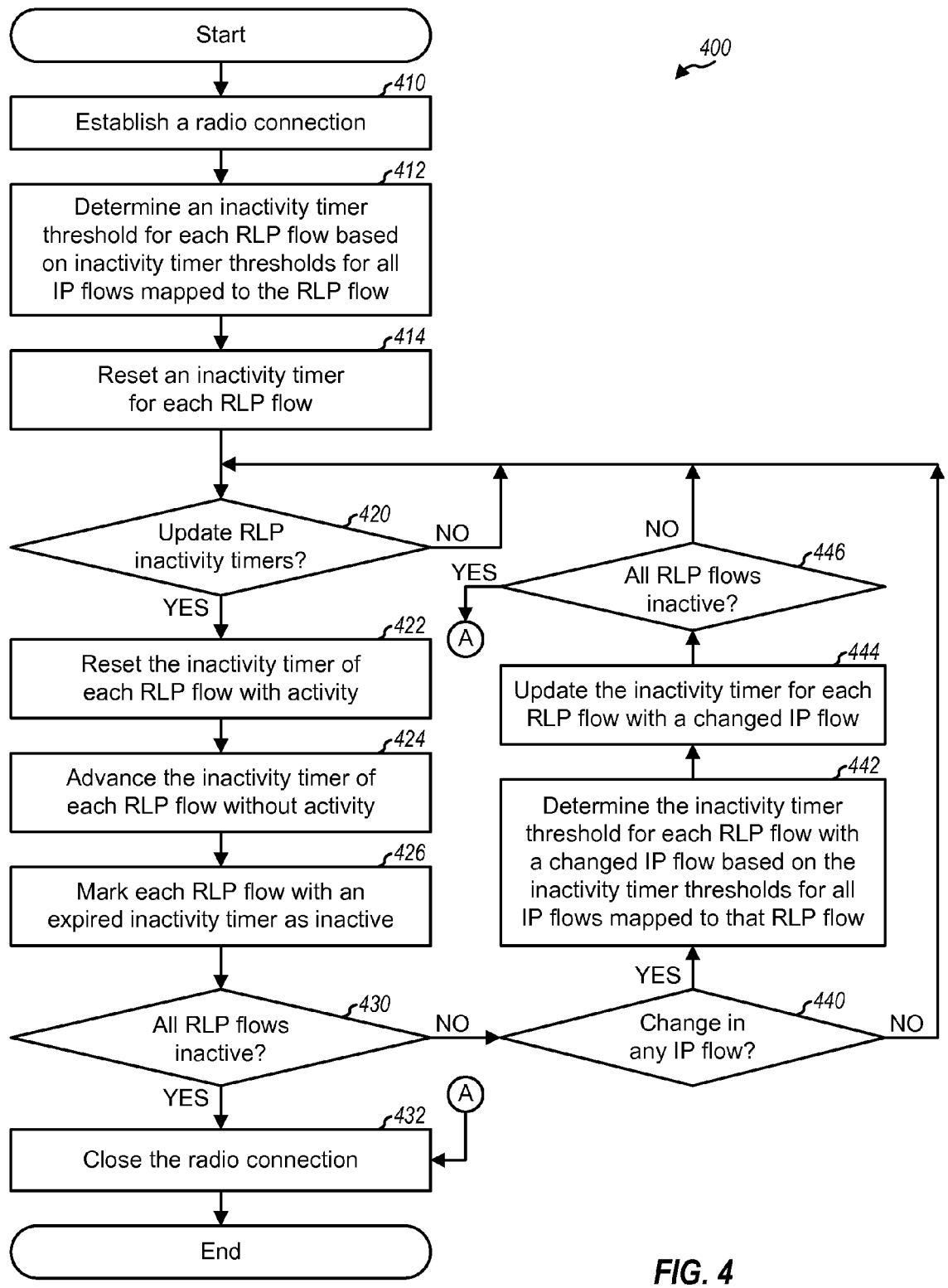
FIG. 4 shows a process for monitoring RLP flows to detect for end of service.

FIG. 4 shows a process 400 for monitoring RLP flows to detect for end of service. Process 400 may be performed by access terminal 110. Initially, a radio connection is established with access network 120 at the start of a call (block 410). For block 410, access terminal 110 may determine QoS profiles for N RLP flows based on QoS requirements (if any) of M IP flows used by K applications. Access terminal 110 may send a connection request message to access network 120 and may receive assignment of radio resources (e.g., one or more traffic channels) and/or other resources (e.g., a MACID) for the radio connection. Access terminal 110 may also exchange signaling with access network 120 to configure the RLP flows and to activate the IP flows, e.g., by turning the reservation labels for the IP flows to an open state.

A dynamic inactivity timer threshold for each RLP flow is determined based on the inactivity timer thresholds for all IP flows mapped to that RLP flow, e.g., as shown in equation (1) (block 412). An inactivity timer for each RLP flow is reset (block 414). A timer may be reset to zero and thereafter incremented or reset to the threshold value and thereafter decremented.

During the call, the inactivity timers for the RLP flows may be updated periodically, e.g., in each frame or time interval of a predetermined duration. A determination is made whether it is time to update the RLP inactivity timers (block 420). If the answer is 'Yes', then the inactivity timer of each RLP flow with activity in the current frame is reset (block 422). The inactivity timer of each RLP flow without activity in the current frame is advanced, e.g., incremented or decremented by the duration of the frame (block 424). A given RLP flow may be deemed as inactive if no packets are received on the RLP flow, or if no packets are sent on the RLP flow, or if no packets are received or sent on the RLP flow, or based on some other criteria. For example, if an RLP flow is deemed as inactive if no packets are received or sent, then its inactivity timer may be reset is a packet is either received or sent on the RLP flow. Each RLP flow with an expired inactivity timer is marked as inactive (block 426). An expired inactivity timer is an inactivity timer that has advanced past its inactivity timer threshold. An inactive flow is a flow in which no activity has been detected (e.g., no data is sent or received) on the flow for a period of time equal to or exceeding its inactivity timer threshold.

A determination is then made whether all RLP flows are inactive (block 430). If the answer is 'Yes', then the radio connection is closed (block 432), and the process terminates. Otherwise, if any RLP flow is still active, then a determination is made whether there is a change in any IP flow, e.g., whether any IP flow has been added, terminated, suspended, resumed, or modified (block 440). If the answer is 'Yes', then the inactivity timer threshold for each RLP flow with a changed IP flow is determined based on the inactivity timer thresholds for all IP flows mapped to that RLP flow (block 442). The inactivity timer for each RLP flow with a changed IP flow is updated, e.g., reset if an IP flow is added (block 444). An RLP flow may become inactive due to termination or suspension of an IP flow mapped to the RLP flow. Thus, a determination is again made whether all RLP flows are inactive (block 446). If the answer is 'Yes', then process proceeds to block 432 and the radio connection is closed. Otherwise, if the answer is 'No' for block 440 or 446, the process returns to block 420.

For IP monitoring, a dynamic inactivity timer threshold may be defined for each IP flow based on all data flows mapped to that IP flow. An inactivity timer threshold may also be defined for each data flow based on the type of traffic data and/or signaling sent on that data flow. The inactivity timer threshold for data flow l is denoted as DF_Th (l), for l ∈ {1, . . . , L}, where L is the number of data flows.

The inactivity timer threshold for each IP flow may be defined based on the inactivity timer thresholds for all data flows mapped to that IP flow, as follows:

$$\text{RES\_Th}(m) = \max_{\forall l \in D_m} \{0, \text{DF\_Th}(l)\}, \text{ for } m \in \{1, \ldots, M\}, \qquad \text{Eq (2)}$$

where $D_m$ is a set of all data flows that are enabled and mapped to IP flow m.

Equation (2) essentially sets the inactivity timer threshold for IP flow m to the largest inactivity timer threshold among those for the data flows mapped to IP flow m. If no data flows are mapped to IP flow m, then the inactivity timer threshold for IP flow m is set to zero, which results in IP flow m being declared inactive. Equation (2) may be applied to each IP flow to determine the inactivity timer threshold for that IP flow.

The inactivity timer threshold DF_Th (l) for a given data flow l may be determined when data flow l is created, activated, or modified, e.g., by an application creating, activating, or modifying data flow l. DF_Th (l) may be selected based on the type of traffic data and/or signaling to be sent on data flow l and/or other information, e.g., as described above for an IP flow. The inactivity timer threshold for each IP flow may be recomputed as shown in equation (2) whenever a data flow is added, terminated, suspended, resumed, or modified. A default value may be used for the inactivity timer threshold for a data flow or an IP flow, e.g., if the inactivity timer threshold is not specified by the application or is for best effort.

Figure 5:
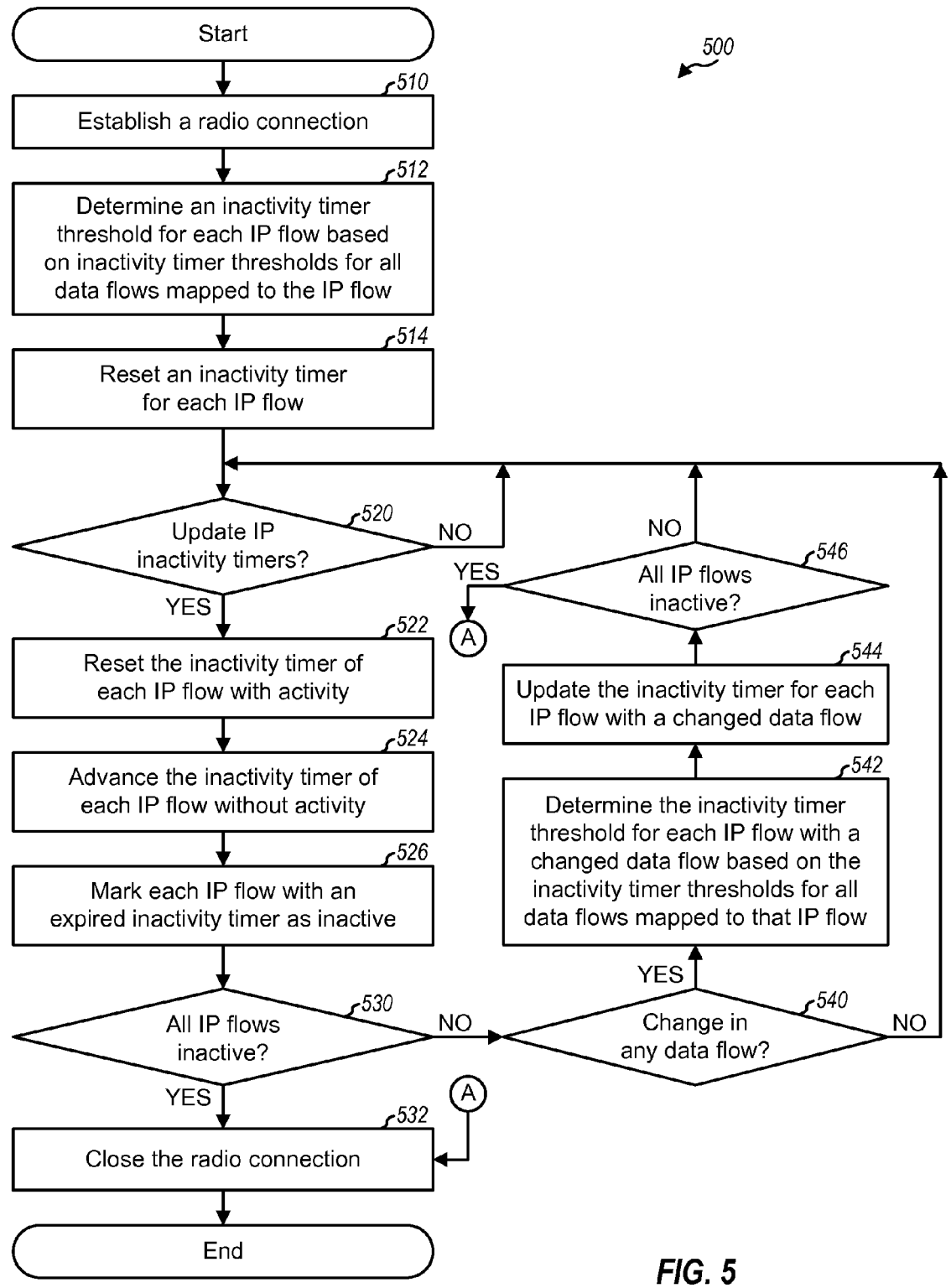
FIG. 5 shows a process for monitoring IP flows to detect for end of service.

FIG. 5 shows a process 500 for monitoring IP flows to detect for end of service. Process 500 may also be performed by access terminal 110. Initially, a radio connection is established with access network 120 at the start of a call (block 510). A dynamic inactivity timer threshold for each IP flow is determined based on the inactivity timer thresholds for all data flows mapped to that IP flow, e.g., as shown in equation (2) (block 512). An inactivity timer for each IP flow is reset (block 514).

During the call, a determination is periodically made whether it is time to update the IP inactivity timers (block 520). If the answer is 'Yes', then the inactivity timer of each IP flow with activity (e.g., received and/or transmitted packets) is reset (block 522). The inactivity timer of each IP flow without activity is advanced (block 524). Each IP flow with an expired inactivity timer is marked as inactive (block 526).

A determination is then made whether all IP flows are inactive (block 530). If the answer is 'Yes', then the radio connection is closed (block 532), and the process terminates. Otherwise, if any IP flow is still active, then a determination is made whether there is a change in any data flow (block 540). If the answer is 'Yes', then the inactivity timer threshold for each IP flow with a changed data flow is determined based on the inactivity timer thresholds for all data flows mapped to that IP flow (block 542). The inactivity timer for each IP flow with a changed data flow is updated (block 546). An IP flow may become inactive due to termination or suspension of a data flow mapped to the IP flow. Thus, a determination is again made whether all IP flows are inactive (block 546). If the answer is 'Yes', then process proceeds to block 532 and the radio connection is closed. Otherwise, if the answer is 'No' for block 540 or 546, the process returns to block 520.

Process 500 may be used for systems with NULL-RLP, which essentially implies the absence of RLP. IP flows or some other flows above RLP may be monitored, and the inactivity timers for these flows may be used to determine end of service.

When monitoring a SIP flow it may be desirable to wait for packets to be delivered over-the-air for a particular minimum amount of time before bringing down the SIP flow. A minimum non-zero timer value for the SIP flow may be considered in determining the inactivity timer value for a lower layer flow (e.g., an IP flow or an RLP flow) carrying the SIP flow.

Figure 6:
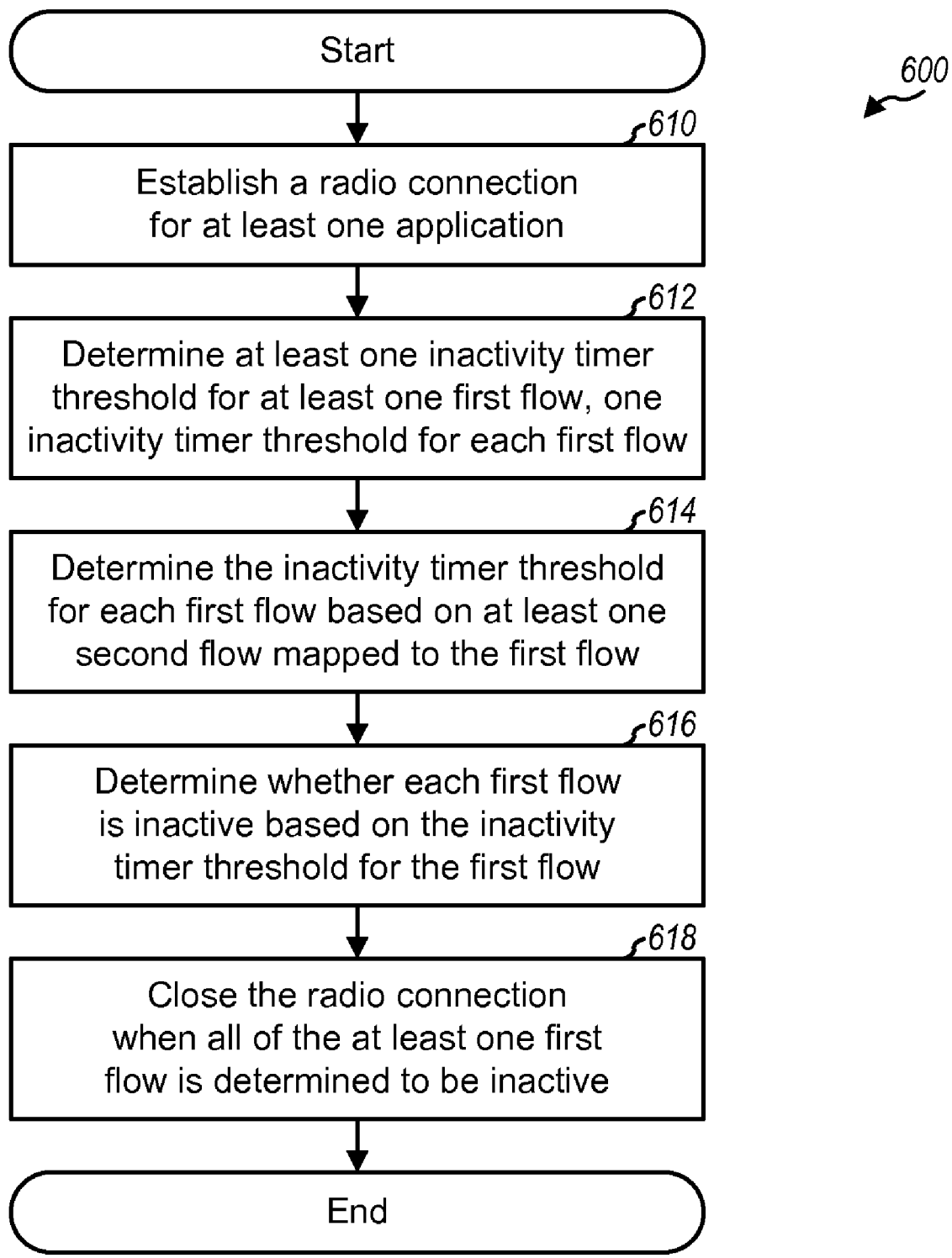
FIG. 6 shows a process for monitoring flows to detect for end of service.

FIG. 6 shows a process 600 for monitoring flows to detect for end of service. A radio connection is established for at least one application (block 612). An inactivity timer threshold for each first flow in at least one first flow may be determined based on at least one second flow mapped to the first flow, e.g., based on the longest of at least one inactivity timer threshold for the at least one second flow mapped to the first flow (block 614). A default value may be used for the inactivity timer threshold for each second flow in which the inactivity timer threshold is unavailable, e.g., is not specified. A default value may also be used for the inactivity timer threshold for each first flow in which an inactivity timer threshold for a second flow mapped to that first flow is unavailable. A dynamic inactivity timer threshold for each first flow may also be determined based on the type of data and/or signaling to be sent on that first flow and/or other factors. The dynamic inactivity timer threshold for a given first flow may also be set to a large value (e.g., infinity), to greater than or equal to a particular minimum value, etc.

Whether each first flow is inactive is determined based on the inactivity timer threshold for that first flow (block 616). For block 616, an inactivity timer may be maintained for each first flow and may be reset whenever activity is detected on that first flow. Each first flow may be declared to be inactive when the inactivity timer for that first flow exceeds the inactivity timer threshold for the first flow. The radio connection may be closed when all of the at least one first flow is determined to be inactive (block 618).

The inactivity timer threshold for each first flow may also be updated based on changes in the second flows. A change in a second flow may be detected, a first flow to which the changed second flow is mapped may be identified, and the inactivity timer threshold for the identified first flow may be determined based on the changed second flow and all other second flows mapped to the identified first flow. The change may correspond to adding, terminating, activating, suspending, or modifying the second flow. The inactivity timer may be maintained independently for each first flow, and expiration of the inactivity timer may be declared independently for each first flow.

Each first flow may correspond to an RLP flow, and each second flow may correspond to an IP flow. Alternatively, each first flow may correspond to an IP flow, and each second flow may correspond to a data flow, e.g., an RTP flow, a SIP flow, a best effort flow, etc. Multiple second flows may be mapped to the at least one first flow based on the QoS requirements of each second flow and a QoS profile of each first flow.

The techniques described herein may be performed by access terminal 110, which may perform process 400 in FIG. 4, process 500 in FIG. 5, process 600 in FIG. 6, and/or other processes to detect for end of service using dynamic inactivity timer thresholds. The techniques may also be performed by access network 120 to detect for end of service for access terminal 110. Access network 120 may monitor activity on RLP flows, IP flows, or some other flows for access terminal 110. The inactivity timer thresholds for the first flows being monitored may be dynamically determined, e.g., based on the second flows mapped to the first flows. Access network 120 may close the radio connection for access terminal 110 when all first flows are determined to be inactive based on their inactivity timers and inactivity timer thresholds.

Figure 7:
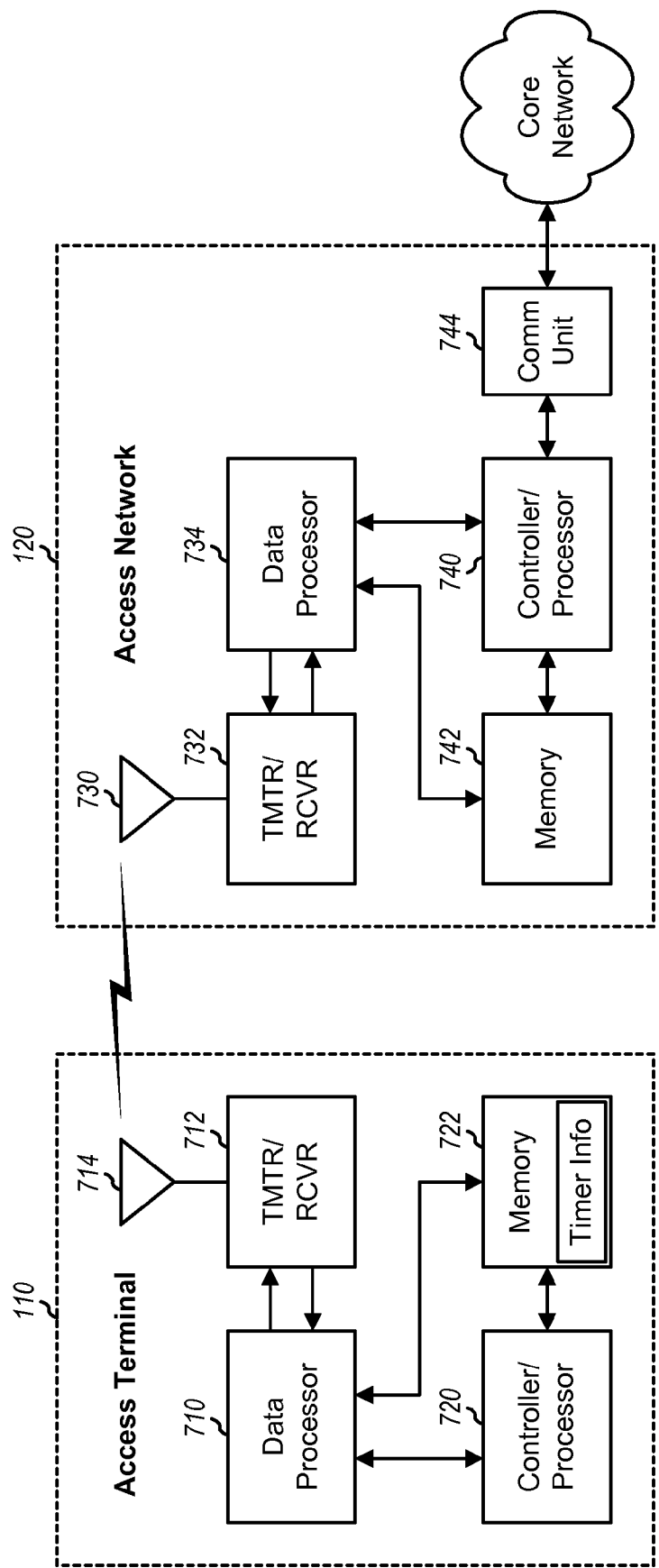
FIG. 7 shows a block diagram of the access terminal and an access network.

FIG. 7 shows a block diagram of access terminal 110 and access network 120. On the reverse link, at access terminal 110, a data processor 710 processes (e.g., formats, encodes, and modulates) data and signaling to be sent to access network 120 in accordance with a radio technology (e.g., HRPD) and generates output chips. A transmitter (TMTR) 712 then conditions (e.g., converts to analog, filters, amplifies, and frequency upconverts) the output chips and generates a reverse link signal, which is transmitted via an antenna 714. At access network 120, the reverse link signals from access terminal 110 and other access terminals are received via an antenna 730 and conditioned (e.g., filtered, amplified, frequency downconverted, and digitized) by a receiver (RCVR) 732 to obtain samples. A data processor 734 then processes (e.g., demodulates and decodes) the samples to obtain the data and signaling sent by access terminal 110 and other access terminals.

On the forward link, at access network 120, data and signaling to be sent to access terminals are processed by data processor 734 and further conditioned by a transmitter 732 to generate a forward link signal, which is transmitted via antenna 732. At access terminal 110, the forward link signal from access network 120 is received via antenna 714, conditioned by a receiver 712, and processed by data processor 710 to obtain data and signaling sent by access network 120 to access terminal 110.

Controllers/processors 720 and 740 control the operation at access terminal 110 and access network 120, respectively. Processor 710, 720, 734 and/or 740 may implement process 400 in FIG. 4, process 500 in FIG. 5, process 600 in FIG. 6, and/or other processes to detect for end of service and to close the radio connection for access terminal 110. Memories 722 and 742 store program codes and data for access terminal 110 and access network 120, respectively. Memory 722 and/or 742 may store timer information such as inactivity timer thresholds for IP flows, RLP flows, etc. Access network 120 may communicate with other network entities via a communication (Comm) unit 744.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 722 or 742 in FIG. 7) and executed by a processor (e.g., processor 720 or 740). The memory may be implemented within the processor or external to the processor.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a processor configured to determine an inactivity timer threshold for each first flow in at least one first flow based on at least one second flow mapped to the first flow, and to determine whether each first flow is inactive based on the inactivity timer threshold for the first flow, wherein the at least one first flow and the at least one second flow are different types of flows;
a memory coupled to the processor, wherein the processor is configured to determine the inactivity timer threshold for each first flow based on at least one inactivity timer threshold for the at least one second flow mapped to the first flow; and
wherein the processor is configured to use a large value for an inactivity timer threshold for a second flow to be remained open until closed by an application.

2. An apparatus comprising:
a processor configured to determine an inactivity timer threshold for each first flow in at least one first flow based on at least one second flow mapped to the first flow, and to determine whether each first flow is inactive based on the inactivity timer threshold for the first flow, wherein the at least one first flow and the at least one second flow are different types of flows;
a memory coupled to the processor, wherein the processor is configured to determine the inactivity timer threshold for each first flow based on at least one inactivity timer threshold for the at least one second flow mapped to the first flow; and
wherein the processor is configured to use a particular minimum value for an inactivity timer threshold for a second flow to be monitored for a particular minimum amount of time.

3. An apparatus comprising:
a first means for determining to determine an inactivity timer threshold for each first flow in at least one first flow based on at least one second flow mapped to the first flow, and to determine whether each first flow is inactive based on the inactivity timer threshold for the first flow, wherein the at least one first flow and the at least one second flow are different types of flows; and
a second means for determining to determine the inactivity timer threshold for each first flow based on at least one inactivity timer threshold for the at least one second flow mapped to the first flow; wherein the second means for determining is configured to use a large value for the inactivity timer threshold for a second flow to be remained open until closed by an application.

4. An apparatus comprising:
a first means for determining to determine an inactivity timer threshold for each first flow in at least one first flow based on at least one second flow mapped to the first flow, and to determine whether each first flow is inactive based on the inactivity timer threshold for the first flow, wherein the at least one first flow and the at least one second flow are different types of flows; and
a second means for determining to determine the inactivity timer threshold for each first flow based on at least one inactivity timer threshold for the at least one second flow mapped to the first flow; wherein the second means for determining is configured to use a particular minimum value for an inactivity timer threshold for a second flow to be monitored for a particular minimum amount of time.

5. A non-transitory medium having stored instructions that when executed by a processor execute a method comprising:
determining an inactivity timer threshold for each first flow in at least one first flow based on at least one second flow mapped to the first flow;
determining whether each first flow is inactive based on the inactivity timer threshold for the first flow, wherein the at least one first flow and the at least one second flow are different types of flows;
determining the inactivity timer threshold for each first flow based on at least one inactivity timer threshold for the at least one second flow mapped to the first flow; and
using a large value for the inactivity timer threshold for a second flow to be remained open until closed by an application.

6. A non-transitory medium having stored instructions that when executed by a processor execute a method comprising:
determining an inactivity timer threshold for each first flow in at least one first flow based on at least one second flow mapped to the first flow;
determining whether each first flow is inactive based on the inactivity timer threshold for the first flow, wherein the at least one first flow and the at least one second flow are different types of flows;

determining the inactivity timer threshold for each first flow based on at least one inactivity timer threshold for the at least one second flow mapped to the first flow; and using a particular minimum value for an inactivity timer threshold for a second flow to be monitored for a particular minimum amount of time.

7. A method comprising:

determining an inactivity timer threshold for each first flow in at least one first flow based on at least one second flow mapped to the first flow;

determining whether each first flow is inactive based on the inactivity timer threshold for the first flow, wherein the at least one first flow and the at least one second flow are different types of flows;

determining the inactivity timer threshold for each first flow based on at least one inactivity timer threshold for the at least one second flow mapped to the first flow; and using a large value for the inactivity timer threshold for a second flow to be remained open until closed by an application.

8. A method comprising:

determining an inactivity timer threshold for each first flow in at least one first flow based on at least one second flow mapped to the first flow;

determining whether each first flow is inactive based on the inactivity timer threshold for the first flow, wherein the at least one first flow and the at least one second flow are different types of flows;

determining the inactivity timer threshold for each first flow based on at least one inactivity timer threshold for the at least one second flow mapped to the first flow; and using a particular minimum value for an inactivity timer threshold for a second flow to be monitored for a particular minimum amount of time.

* * * * *